United States Patent
Umeda et al.

(10) Patent No.: US 9,036,205 B2
(45) Date of Patent: May 19, 2015

(54) IMAGE PROCESSING APPARATUS AND METHOD FOR CORRECTING LUMINANCE AND SATURATION OF A PIXEL IN AN IMAGE OR OF A TARGET LATTICE POINT IN A LOOKUP TABLE

(71) Applicant: CANON KABUSHIKI KAISHA, Tokyo (JP)

(72) Inventors: Kiyoshi Umeda, Kawasaki (JP); Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/047,346

(22) Filed: Oct. 7, 2013

(65) Prior Publication Data
US 2014/0037208 A1    Feb. 6, 2014

Related U.S. Application Data

(62) Division of application No. 12/811,918, filed as application No. PCT/JP2010/058489 on May 13, 2010, now Pat. No. 8,675,249.

(30) Foreign Application Priority Data

May 21, 2009    (JP) .................... 2009-122804

(51) Int. Cl.
*G06T 5/00*    (2006.01)
*G06T 1/00*    (2006.01)
(Continued)

(52) U.S. Cl.
CPC ... *G06T 5/00* (2013.01); *G06T 1/00* (2013.01); *H04N 1/4074* (2013.01); *H04N 1/6027* (2013.01)

(58) Field of Classification Search
CPC ......... H04N 1/56; H04N 1/60; H04N 1/6002; H04N 1/6008; H04N 1/6027; H04N 1/6058; H04N 1/6075
USPC .......... 358/1.1, 1.9, 3.23, 500, 501, 504, 518, 358/520, 523
See application file for complete search history.

(56) References Cited

U.S. PATENT DOCUMENTS 6,823,083 B1    11/2004 Watanabe et al.
6,917,444 B1    7/2005 Moriwaki
(Continued)

FOREIGN PATENT DOCUMENTS

JP    10062252 A * 3/1998
JP    2001-045311 A    2/2001
(Continued)

OTHER PUBLICATIONS

Search Report issued in European Patent Application No. 10777796.3, dated Jan. 3, 2013.
(Continued)

*Primary Examiner* — Thomas D Lee
(74) *Attorney, Agent, or Firm* — Fitzpatrick, Cella, Harper & Scinto

(57) ABSTRACT

A gradation-correcting curve to correct a gradation of an input image is generated. Gradation correction based on the gradation-correcting curve is made to a boundary pixel of a color-reproduction space at the same saturation as that of a target lattice point and at a hue of the target lattice point. An equal-saturation line is set by using the boundary pixel of the color-reproduction space after the gradation correction. A saturation-correction amount of the target lattice point is decided based on the gradation-correcting curve and the equal-saturation line.

14 Claims, 17 Drawing Sheets

(51) Int. Cl.
*H04N 1/407* (2006.01)
*H04N 1/60* (2006.01)

(56) References Cited

U.S. PATENT DOCUMENTS

| | | |
|---|---|---|
| 7,006,668 B2 | 2/2006 | Iguchi et al. |
| 7,092,122 B2 | 8/2006 | Iwaki |
| 7,167,205 B2 | 1/2007 | Akiyama et al. |
| 7,215,343 B2 * | 5/2007 | Edge .............. 345/604 |
| 7,339,619 B2 | 3/2008 | Tsuruoka |
| 7,382,403 B2 | 6/2008 | Sakamoto |
| 7,738,030 B2 | 6/2010 | Akiyama et al. |
| 2004/0218075 A1 | 11/2004 | Tsuruoka |
| 2007/0081177 A1 | 4/2007 | Um et al. |
| 2009/0034840 A1 | 2/2009 | Umeda et al. |
| 2010/0260415 A1 | 10/2010 | Sakai et al. |

FOREIGN PATENT DOCUMENTS

| | | |
|---|---|---|
| JP | 2002-271644 A | 9/2002 |
| JP | 2003-125222 A | 4/2003 |
| JP | 2003-125224 A | 4/2003 |
| JP | 2004-070414 A | 3/2004 |
| JP | 2004-072272 A | 3/2004 |
| JP | 2004-312467 A | 11/2004 |
| JP | 2006-148248 A | 6/2006 |

OTHER PUBLICATIONS

Notification Concerning Transmittal of International Preliminary Report on Patentability (PCT/IPEA/416), and International Preliminary Report on Patentability (PCT/IPEA/409), dated Apr. 12, 2011, in PCT Application No. PCT/JP2010/058489.

Japanese Office Action dated Jan. 28, 2014, issued in counterpart Japanese Application No. 2013-005003, and English-language translation thereof.

Japanese Office Action dated Sep. 2, 2014, issued in counterpart Japanese Application No. 2013-005003.

* cited by examiner

IMAGE PROCESSING APPARATUS AND METHOD FOR CORRECTING LUMINANCE AND SATURATION OF A PIXEL IN AN IMAGE OR OF A TARGET LATTICE POINT IN A LOOKUP TABLE

This is a Divisional Application of application Ser. No. 12/811,918 filed on Jul. 7, 2010, pending, which is the National Stage of International Application No. PCT/JP2010/058489, filed May 13, 2010.

TECHNICAL FIELD

The invention relates to image processing apparatus and method in which when a desired gradation correction is made to an image, by making proper saturation control, a good correction result, in which the viewer does not feel that a saturation decrease has occurred, can be obtained.

BACKGROUND ART

In recent years, a technique for detecting a main object, such as a person, from an image and making such gradation correction that a brightness of the object is made proper has been proposed. In this instance, it is a subject to prevent a viewer from feeling that a saturation decrease has occurred after the gradation correction. This point will be described by using FIGS. 22 and 23.

FIG. 22 is an example of a pixel value included in a dark area in the image. The abscissa axis indicates each component of RGB and the ordinate axis indicates component values. Since the pixel is a pixel in the dark area, the RGB component values are small values as a whole.

As for such a pixel value, the RGB component values are converted into a luminance-color-difference space (for example, YCbCr space), only a luminance component is increased by a predetermined amount in such a space and converted into the RGB space again, and an obtained result is illustrated in FIG. 23.

As illustrated in FIG. 23, if only a luminance value in the luminance component is increased by a predetermined amount, a predetermined amount 2301 is uniformly added to all components in the RGB space.

As is well known, a state where the saturation of the pixel value is large is a state where relative differences among the RGB components are large. If the relative ratio among the RGB components is equal to 1.0, that is, if they have the same value, such a pixel is regarded as a gray pixel having a saturation of 0. For example, in FIG. 22, although the relative ratio of the G component to the R component is equal to about 2.0 times, such a ratio after the increase in luminance is equal to about 1.3 times and it can be confirmed that the saturation was reduced.

If only the luminance in the pixel value included in the dark area in the image is increased in the luminance-color-difference space as mentioned above, an unattractive image is obtained in which the saturation is reduced.

To solve the above problem, a method of controlling the saturation so as to keep a relative distance to a color-space boundary in the luminance-color-difference space has been proposed in the Official Gazette of Japanese Patent Application Laid-Open No. 2001-45311. The Official Gazette of Japanese Patent Application Laid-Open No. 2002-271644 has also been known as a similar example. In the Official Gazette of Japanese Patent Application Laid-Open No. 2002-271644, various kinds of color-space-boundary examples are presented and a method of relatively maintaining the saturation in a range before and after the luminance increasing process by executing processes which are almost similar to those in the Official Gazette of Japanese Patent Application Laid-Open No. 2001-45311 is disclosed.

However, the above-described art have the following problems.

First, if the method of keeping the relative distance to the color-space boundary as disclosed in the related art is uniformly applied with respect to all hues and saturations, there is a case where a correction result indicates overcorrection. For example, the reproducibility of a skin-color area is an element that becomes very important in an output of a digital camera or a printer. It has been confirmed by experiments that if the above system is applied to the skin-color area, the saturation is excessively emphasized and a human skin and face become reddish, so that an undesirable result is obtained.

Problems that occur when applying the Official Gazette of Japanese Patent Application Laid-Open No. 2001-45311 will be described by using FIG. 24. In the diagram, the ordinate axis indicates the luminance and the abscissa axis indicates the saturation at a certain hue. Reference numerals 2405 and 2404 denote a saturation value and a luminance value of a target-pixel value before and after the luminance correction, respectively. Reference numeral 2401 denotes a boundary of an arbitrary color space (for example, sRGB space). That is, it is assumed that the sRGB color space can exist only in a closed area surrounded by the boundary 2401 and a Y axis. In this case, when relative distances 2403 and 2402 from the color-space boundary 2401 before and after the increase in luminance of the target pixel are equal as illustrated in the diagram, even if the luminance is increased, the saturation is not emphasized and an unattractive image that provides the viewer with a feeling that the saturation has decreased is also obtained.

Further, a case will now be considered in which the luminance of a target pixel 2503 before the correction is larger than the luminance value of a maximum saturation point 2502 at the hue of the target pixel, as illustrated in FIG. 25. In this case, if it is intended to maintain the relative relation with a color-space boundary 2501, the saturation of a pixel 2504 after the correction decreases as compared with that before the correction as illustrated in the diagram. In this case, an unattractive image that provides the viewer with the feeling that a saturation decrease has occurred is also obtained.

The invention is made in consideration of the foregoing problems and intends to present image processing apparatus and method in which, by making proper saturation control, even after a gradation correction was made, a good-looking, desirable image, better than that in the related art, can be provided, while preventing overcorrection and preventing the viewer from feeling that a saturation decrease has occurred.

DISCLOSURE OF THE INVENTION

To accomplish the above object, according to the invention, there is provided an image processing apparatus comprising: means for generating a gradation-correcting curve adapted to correct the gradation of an input image; equal-saturation-line setting means for setting an equal-saturation line after luminance correction for an arbitrary hue based on the gradation-correcting curve in a luminance-color-difference space; and saturation correcting means for making a saturation correction to input image data after the luminance correction based on the equal-saturation line. For the input image data after the luminance correction, the saturation correcting means corrects the equal-saturation line so as to be away from a luminance axis as the luminance is smaller and to approach the luminance axis as the luminance is larger.

To accomplish the above object, according to the invention, there is provided an image processing method comprising: generating a gradation-correcting curve adapted to correct a gradation of an input image; setting an equal-saturation line after luminance correction for an arbitrary hue based on the gradation-correcting curve in a luminance-color-difference space; and making a saturation correction to input image data after the luminance correction based on the equal-saturation line. In the saturation correction, for the input data after the luminance correction, the equal-saturation line is corrected so as to be away from a luminance axis as the luminance is smaller and to approach the luminance axis as the luminance is larger.

According to the invention, by newly setting the equal-saturation line after the gradation correction of the image and setting a saturation-correction amount based on the equal-saturation line, a decrease in saturation after the gradation correction can be prevented and a proper saturation-correction amount according to the luminance value after the gradation correction can be determined.

It is an object of the invention to provide a new function. To accomplish the above objects, claims and other features of the invention will be apparent from the following description and drawings.

Further features of the present invention will become apparent from the following description of exemplary embodiments with reference to the attached drawings.

BRIEF DESCRIPTION OF DRAWINGS

The accompanying drawings, which are incorporated in and constitute apart of the specification, illustrate embodiments of the invention and, together with the description, serve to explain the principles of the invention.

BEST MODE FOR CARRYING OUT THE INVENTION

First Embodiment

The exemplary first embodiment of the invention will be described hereinbelow. Although the following description will be made by presuming an image processing unit in a printer main body, one embodiment is merely illustrated here as an example and the invention is not limited to the following embodiments.

<Description of Hardware>

Figure 2:
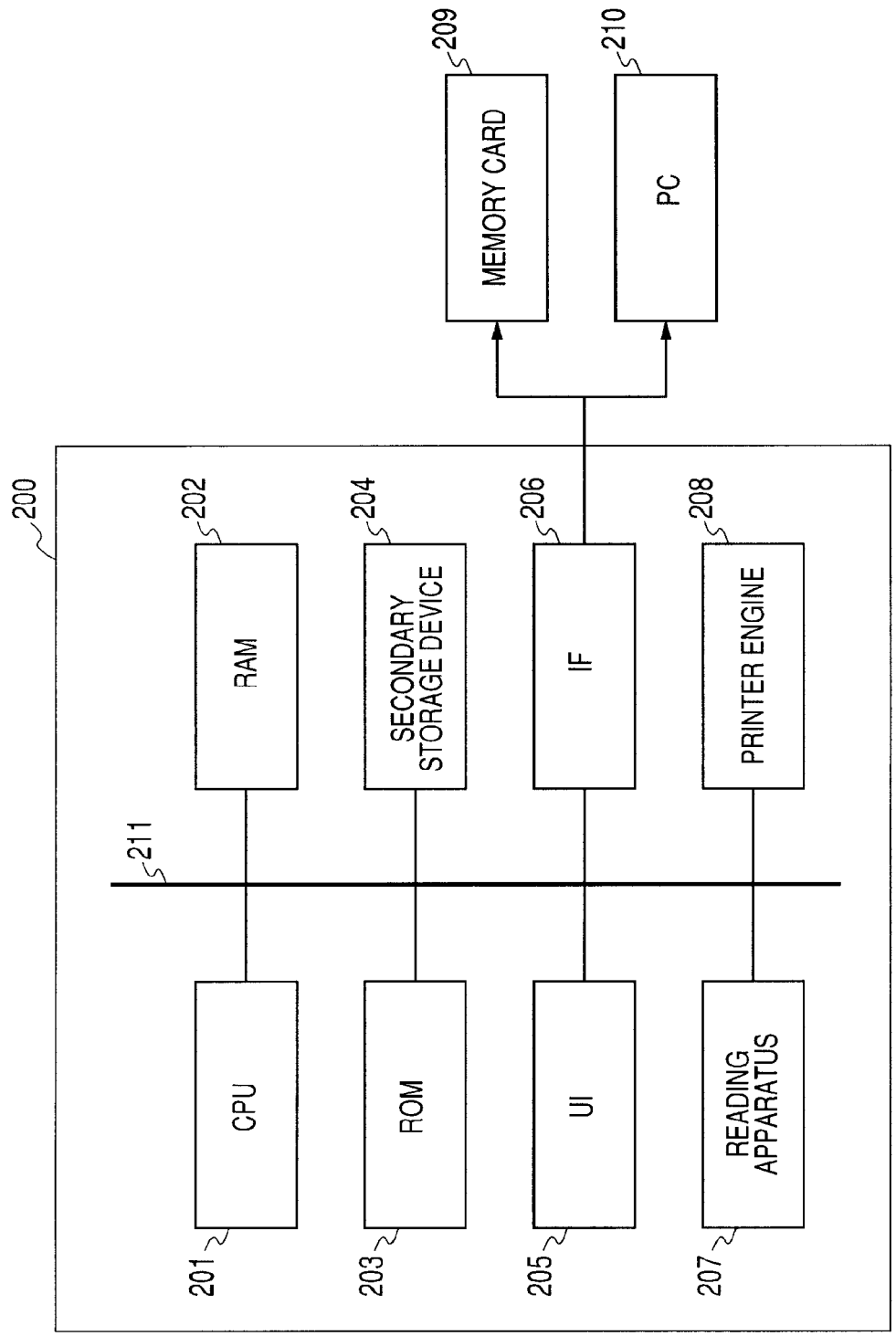
FIG. 2 is example of a hardware construction that can execute an image processing method of the invention.

FIG. 2 illustrates an example of a hardware construction 200 of a printer that can execute an image processing method of the invention. Reference numeral 201 denotes a CPU; reference numeral 203 denotes a ROM in which various kinds of control program tables have been stored; reference numeral 202 denotes a RAM; and reference numeral 204 denotes a secondary storage device (for example, hard disk). Reference numeral 205 denotes a user interface including an operating unit, a display apparatus, and the like. Reference numeral 206 denotes an external interface (for example, USB (registered trademark), memory card reader) that reads out image data from a memory card 209 through the interface and is connected to a personal computer 210. Reference numeral 207 denotes an original reading apparatus (for example, scanner) and reference numeral 208 indicates a print engine. The above resources are connected to a system bus 211.

The CPU 201 loads a program (including a processing program, which will be described hereinafter) stored in the ROM 203 or the secondary storage device 204 into the RAM 202 serving as a work memory and executes the program. The CPU 201 controls each of the above constructions through the system bus 211 according to the program, thereby realizing functions of the program.

<Block Diagram of Processes>

Figure 3:
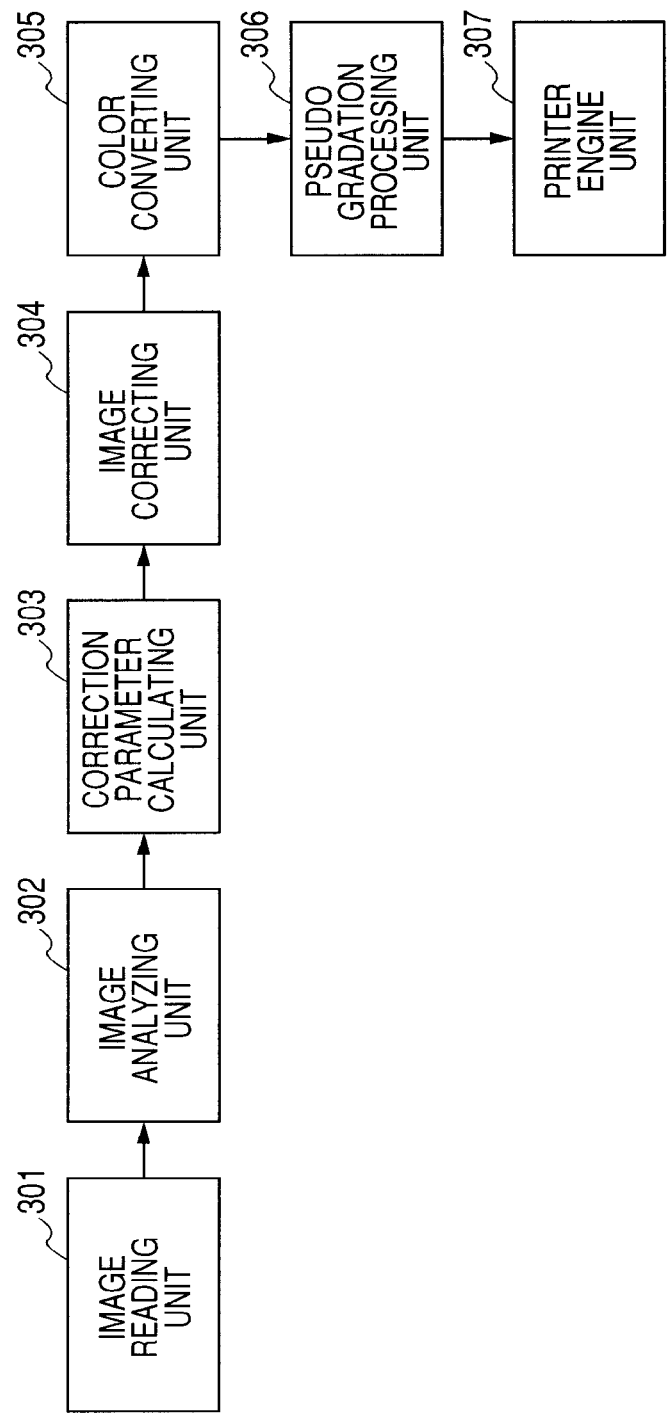
FIG. 3 is block diagram of processes in the first embodiment.

FIG. 3 is a block diagram of processes in the embodiment and illustrates the processes that are executed by the CPU 201. When an instruction of, for example, a printing process or the like in a printer (print instruction) is input through the UI 205, first, in the image reading unit 301, image data serving as a processing target is read out of the memory card or the image reading apparatus 207 (for example, a scanner) connected to the IF 206.

Subsequently, an analyzing process of the image is executed in an image analyzing unit 302. In the image analyzing unit 302 in the embodiment, mainly, a properness degree of exposure of a photograph image is discriminated.

Various kinds of methods are considered for the above-noted discriminating process. For example, there is considered a method whereby a face area of a person is extracted from the image by using the well-known face detecting technique and a properness degree is discriminated from the brightness of the face area.

Subsequently, in a correction-parameter calculating unit 303, various kinds of parameters adapted to correct the image are calculated based on the discrimination of the properness degree of the exposure. The parameters that are calculated will be described in detail hereinafter.

Subsequently, in an image correcting unit 304, the image is corrected by using the correction parameters. In a color converting unit 305, the image after the correction is converted into ink color components (for example, CMYK). After that, in a pseudo-gradation=processing unit 306, a pseudo-gradation process (for example, error diffusion, dither) is executed for every ink color component. In a print engine unit 307, a print process is executed to a print medium.

An outline of the processes has been described above by using the block diagram.

<Description of Flowchart>

Each of the foregoing processing blocks will be described in detail hereinbelow with reference to a flowchart for the processes in the embodiment.

<Image Reading Unit>

In the image reading unit 301, processing-target-image data is read. The reading can be realized by a method whereby image data included in the memory card connected through the IF 206 is read or data obtained by optically scanning an original by the reading apparatus 207. The read image data is sent to a process of the next stage together with flag information for identifying whether its color space is, for example, an sRGB space, an adobe RGB (registered trademark of Adobe Systems, Inc.) space, or further, another color space.

<Image Analyzing Unit>

Figure 4:
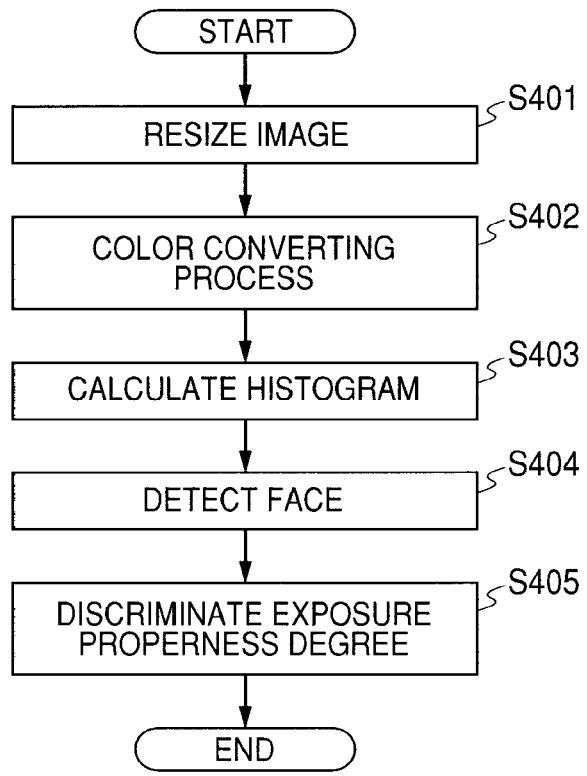
FIG. 4 is flowchart for an image analyzing unit.

FIG. 4 illustrates a flowchart, which is executed by the image analyzing unit 302. First, in S401, the input image is resized. In a subsequent histogram calculating process and a subsequent face detecting process, for example, in the case where the input image is constructed by 4000×3000 pixels, if the processes are executed to all of the pixels, an extremely large processing amount is necessary. In the face detecting process and the histogram calculating process, by reducing the image to a resolution sufficient to capture its feature and executing the processes on the reduced-resolution image, the whole processing amount can be decreased. In the embodiment, although a reducing algorithm and the reduction resolution are not particularly specified, if the image is reduced to, for example, a VGA size (corresponding to 640×480 pixels), it is effective.

Subsequently, in S402, a color converting process is executed to the reduced image. This is because in the subsequent analyzing process, if the process is executed in a common color space, a parameter design in an exposure-properness-degree discriminating unit or the like becomes easier. In the embodiment, the common color space is assumed to be the sRGB space and in the case where another color space is input, it is converted into the sRGB space by using the well-known converting means in S402.

Figure 5:
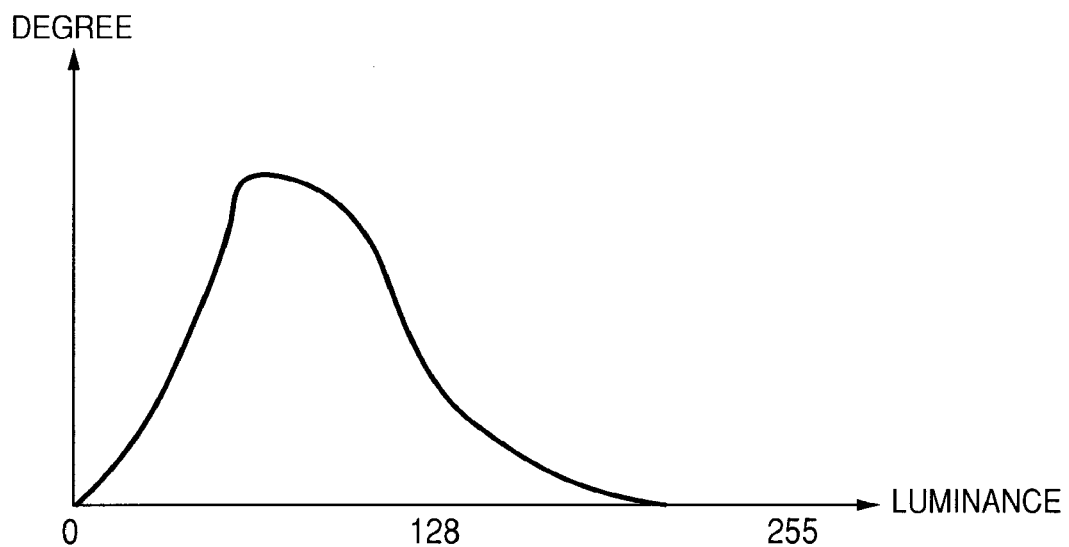
FIG. 5 is diagram for describing a luminance histogram.

Subsequently, in S403, a histogram of the whole image is calculated. Although any method may be used to calculate the histogram, it is assumed here that sRGB values of each pixel are converted into a luminance-color-difference space (for example, YCbCr space) and the histogram is calculated every component. In the case where the input image has been photographed in an underexposure state as a whole, the luminance component histogram (assumed to be 8-bit precision) becomes a distribution that deviates to a dark portion as illustrated in FIG. 5.

Subsequently, in S404, a desired object is detected from the image. Although the object is not particularly limited in the embodiment, a main object detection will be described here with respect to a human face as an example. Although various kinds of methods have been proposed so far with respect to the detection of the human face, any of them may be used in the embodiment.

Subsequently, in S405, a properness degree of exposure is discriminated by using the foregoing histogram information and the face-detection information.

Figure 6:
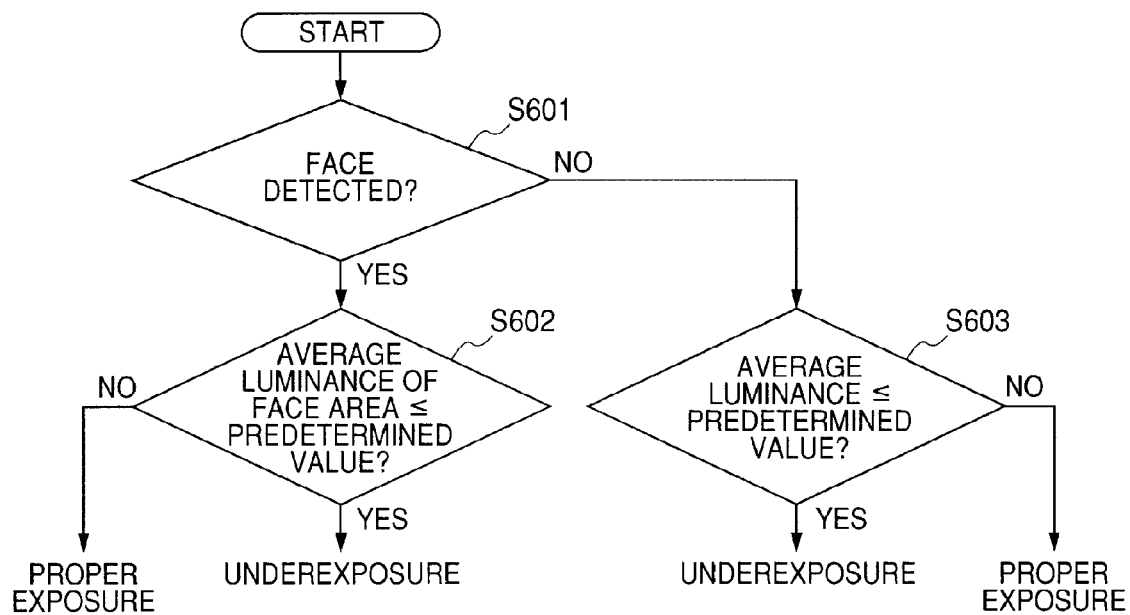
FIG. 6 is flowchart for an exposure-properness-degree discriminating process.

FIG. 6 illustrates an example of the simple properness-degree discrimination in the embodiment. In S601, whether or not the face could be detected is discriminated. If it could be detected, in S602, an average luminance value in the face area is compared with a threshold value adapted to decide a predetermined exposure-properness degree. If the average luminance value in the face area is larger than the threshold value as a result of comparison, it is determined that the exposure is proper. If it is smaller than the threshold value, it is determined that the exposure is insufficient. When the face cannot be detected, in S603, the average luminance value of the whole image calculated from the histogram is compared with a predetermined threshold value. If it is larger than the threshold value, it is decided that the exposure is proper. If it is smaller than the threshold value, the underexposure is determined to have occurred.

The image analyzing unit 302 in the embodiment has been described above.

<Correction-Parameter Calculating Unit>

Figure 7:
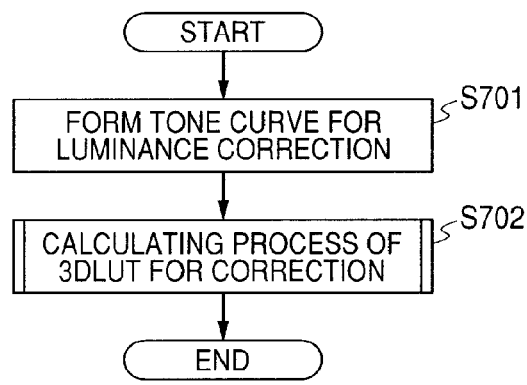
FIG. 7 is flowchart for the correction-parameter calculating unit.

Processes which are executed by the correction-parameter calculating unit 303 will be described hereinbelow by using a flowchart of FIG. 7.

Figure 8:
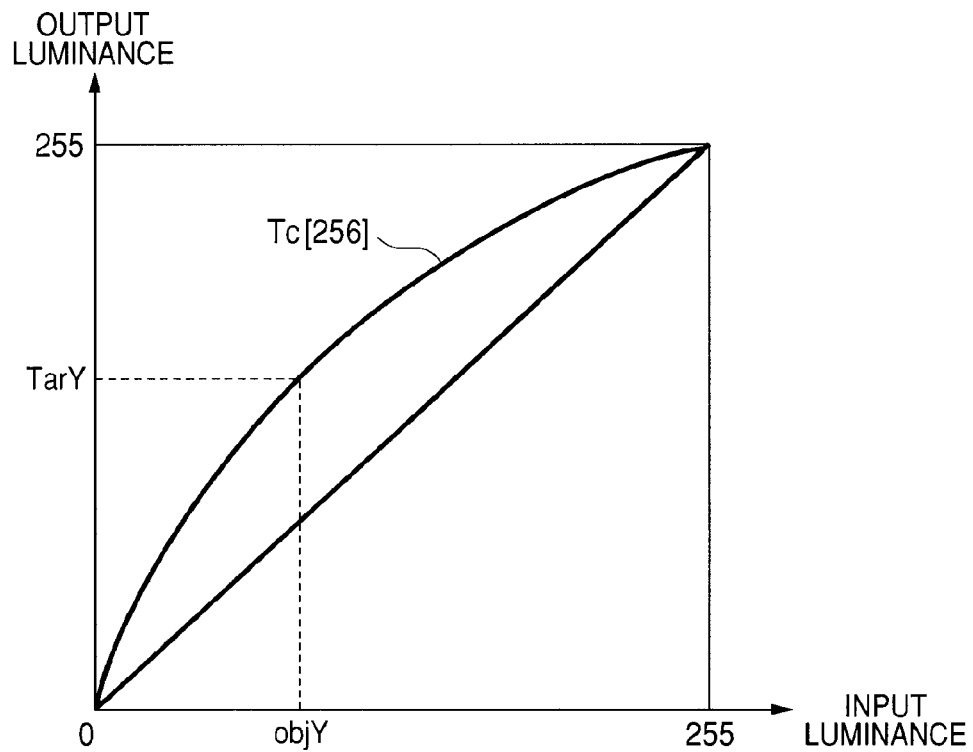
FIG. 8 is explanatory diagram of a gradation-correcting curve for luminance correction.

First, in S701 in the diagram, a tone curve for luminance correction Tc[256] (gradation-correcting curve) is generated according to a result of the exposure-properness-degree discrimination. FIG. 8 illustrates an example of generation of the tone curve in the case where the underexposure has been determined to have occurred in the embodiment. In FIG. 8, the abscissa axis indicates a luminance before the correction and the ordinate axis indicates a luminance after the correction. As for ObjY and TarY, if the face could be detected, ObjY denotes an average luminance in the face area and TarY denotes a preset target-luminance value in the face area. If the face could not be detected, ObjY denotes an average luminance in the whole image and TarY denotes a preset target value of the average luminance in the whole image. If the underexposure is not determined, the tone curve may be set to such a straight line that the luminance value before the correction and the luminance value after the correction coincide. Although the tone curve may be generated in any luminance range and bit precision, in the embodiment, for simplicity of description, a 1-dimensional lookup table in which an output luminance value to each input luminance value of 8-bit precision (0~255) is stored in 256 arrays is presumed.

<Formation of 3DLUT>

Subsequently, in S702 in FIG. 7, a 3-dimensional lookup table (hereinbelow, 3DLUT) for correction is formed by using the foregoing tone curve (gradation-correcting curve).

A case where a resolution of the input image data is a high resolution image of 3000×4000 pixels as mentioned above will now be considered. In this case, if the luminance correction is made for every pixel by using the tone curve, after that, a saturation-emphasis amount (saturation-correction amount), which will be described hereinafter, is calculated, and it is intended to make a saturation correction, requiring a very large amount of calculations. In the case of hardware in which a high-speed CPU and a high-speed access RAM have been mounted like a recent personal computer, a very large amount of arithmetic operating processes, as will be described hereinafter, can be also realized. However, in a device built-in apparatus (for example, a digital camera or a printer), it is impossible to process at a practical speed.

Therefore, a correcting method using the 3DLUT will be described in the embodiment. According to the 3DLUT system, the foregoing correction arithmetic operation is executed only for a pixel value of a predetermined lattice point and for the pixel value between the lattice points, and the pixel value after the correction is calculated by using the well-known interpolation arithmetic operation. For example, in the well-known tetrahedron-interpolation arithmetic operation, the value of one pixel one component can be calculated by executing several comparison arithmetic operations and four multiplications and there is such a merit that a high-speed process can be executed.

Figure 1:
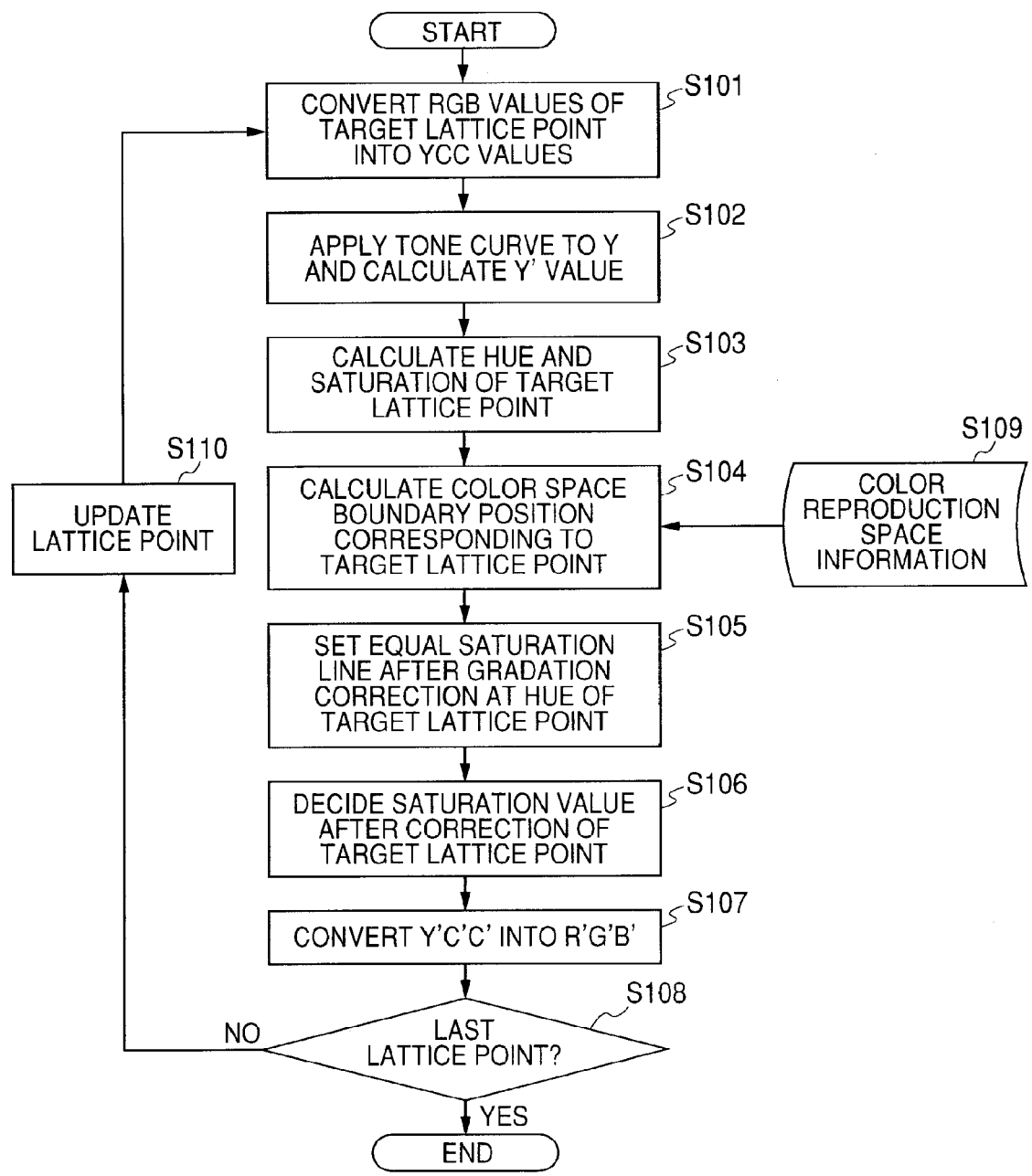
FIG. 1 is flowchart for a correction-parameter calculating unit in the first embodiment.

FIG. 1 illustrates a flowchart for the 3DLUT forming process in the embodiment. In the embodiment, for example, a 3DLUT, in which the number of lattice points in the sRGB space is equal to 729, is formed. The 3DLUT having 729 lattice points can be obtained by uniformly dividing each of the RGB component values (0~255) of the 8-bit precision into 32 intervals.

First, the RGB values (R, G, B) of the first lattice point are converted into luminance-color-difference components (here, YCbCr components) in S101. It is sufficient to perform the conversion by the well-known formula.

Subsequently, in S102, the tone curve Tc illustrated in FIG. 8 is applied to an obtained luminance component Y, thereby obtaining a luminance value Y' after the correction by the following equation.

$Y'=Tc[Y]$

Figure 9:
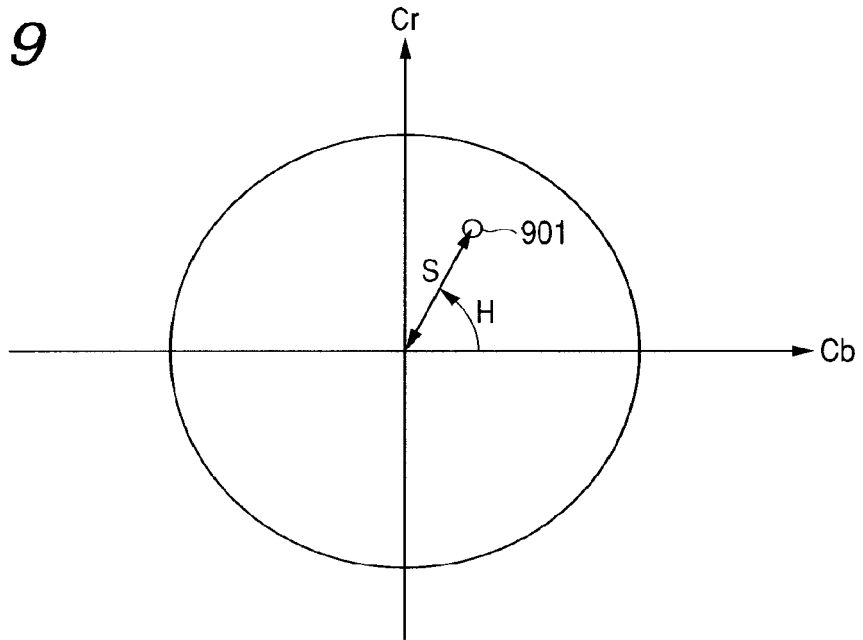
FIG. 9 is diagram for describing a calculating method of a saturation and a hue.

Subsequently, in S103, a hue and a saturation of a target lattice point are calculated by using color-difference components CbCr values calculated in S101. FIG. 9 is a diagram for describing a calculating method of the hue and saturation of a target lattice point 901. In the diagram, the abscissa axis indicates the Cb value and the ordinate axis indicates the Cr value. The hue can be expressed by an angle H on a CbCr plane, as illustrated in the diagram. The saturation can be expressed by a distance S from the origin on the CbCr plane, as illustrated in the diagram.

Subsequently, in S104, a color-space-boundary position corresponding to the target lattice point is calculated by using the YCbCr values of the target lattice point, the Y' value after the luminance correction, and further, color-reproduction-space information 109 which has previously been held.

Figure 10:
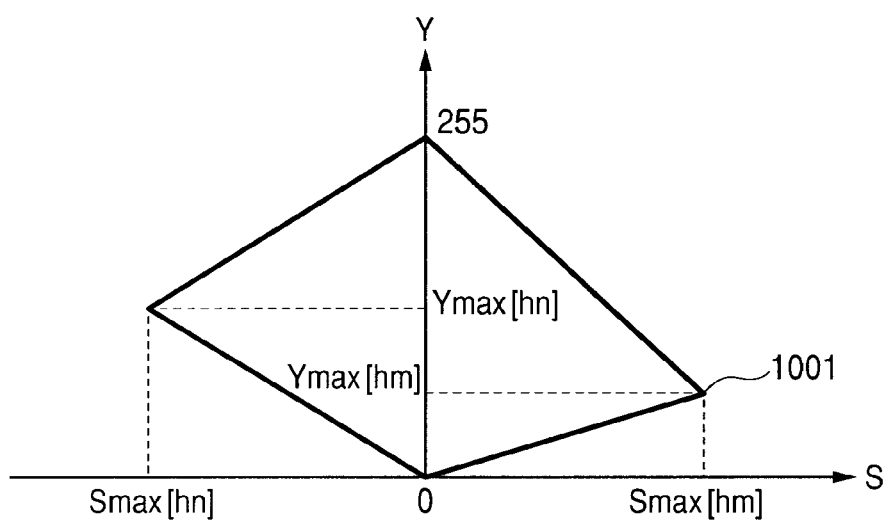
FIG. 10 is diagram for describing color-reproduction-space information.

The color-reproduction-space information 109 will be described prior to describing the present step. FIG. 10 illustrates a boundary of the sRGB color space in the luminance-color-difference space. In FIG. 10, the abscissa axis indicates a saturation value (distance from the origin) at a certain hue and the ordinate axis indicates a luminance component (0~255). In the diagram, an inside of a rectangular area surrounded by straight lines shows an existence range of the sRGB color space and its boundary can be approximated almost by a straight line as illustrated in the diagram. Therefore, in the embodiment, as boundary information of the sRGB color space, a saturation value Smax[hm] and a luminance value Ymax[hm] of a maximum saturation point 1001 at an arbitrary hue hm as illustrated in the diagram are preliminarily calculated and stored into the ROM 203 as boundary information of the sRGB color space. Although an interval between the hues at the time of holding Smax and Ymax is not particularly limited in the embodiment, for example, if they are held every hue interval of every 1° in a range from 0° to 360° of the hue, the precision is also high and it is effective. Although the diagram is illustrated by a 2-dimensional plane of only the hue direction for simplicity of description, actually, a similar color-space boundary is formed every hue in the YCbCr 3-dimensional space.

Figure 11:
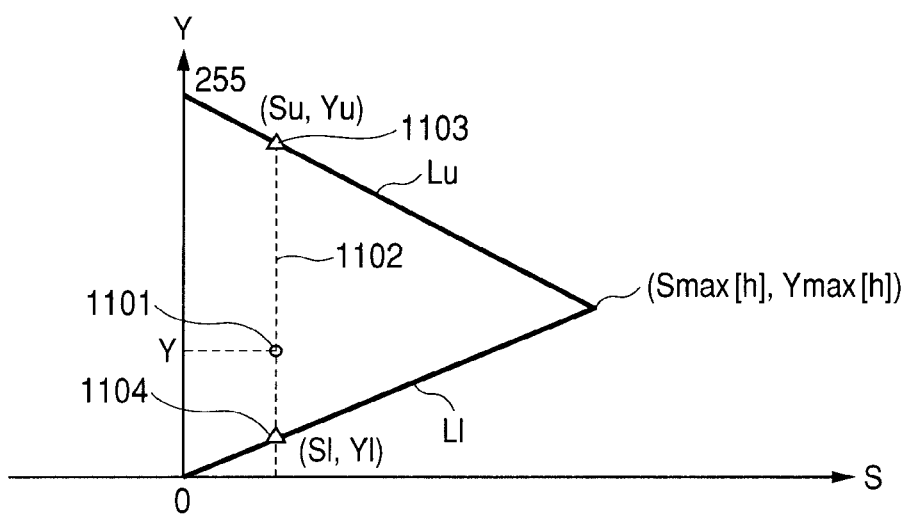
FIG. 11 is explanatory diagram of a calculating method of a color-space boundary position corresponding to a target lattice point.

In S104, the color-space-boundary position corresponding to the target lattice point is calculated based on the color-reproduction-space information. A color-space-boundary-position calculating process will be described hereinbelow by using FIG. 11. First, assuming that a hue of a target lattice point 1101 is equal to h, color-space-boundary straight lines Lu and Ll on a luminance/saturation plane are formed with reference to values of Smax[h] and Ymax[h] of the color-reproduction-space information. Lu and Ll are the straight lines obtained by connecting from a point (Smax[h], Ymax[h]) to points (255, 0) and (0, 0), respectively. Further, a straight line 1102 showing the same saturation as that of the target lattice point 1101 is formed and points 1103 and 1104, where the straight line crosses Lu and Ll, are assumed to be a top point (Su, Yu) and a bottom point (Sl, Yl) of the color-space boundary corresponding to the target lattice point, respectively.

Subsequently, in S105, the tone curve for gradation correction is applied to the calculated top point (boundary pixel) and bottom point (boundary pixel) and a top point and a bottom point after the gradation correction are set (the color-space-boundary position is updated) and an equal-saturation line (saturation correction line) after the gradation correction is set by using them. The equal-saturation line is such a line that even if the luminance values differ, it can be considered that the saturations are equal.

The equal-saturation-line setting process in the embodiment will be described by using FIG. 12. In the diagram, the tone curve (gradation-correcting curve) is applied to the luminance components of the top point and the bottom point and luminance values Yu' and Yl' after the correction are calculated.

$Yu'=Tc[Yu]$ $Yl'=Tc[Yl]$

Subsequently, with respect to the bottom point, since the bottom point exists inherently on the color-space-boundary straight line Ll, the bottom point after the luminance correction is also set to (Sl', Yl') in the diagram so as to be located on the straight line Ll. The point (Sl', Yl') is set in the fashion described here with reference to FIG. 12. First, the gradation correction is made on the point (Sl, Yl) to determine the point (Sl, Yl'). Next, a line is drawn from the point (Sl, Yl') in parallel to the S axis. Finally, the intersection of the line and the straight line Ll is set as the point (Sl', Yl'). Subsequently, with respect to the top point, although the top point exists inherently on the color-space-boundary straight line Lu, if the top point after the luminance correction is also set so as to be located on the straight line Lu, the saturation decreases to a value smaller than that before the correction and there is a risk that an unattractive image is formed. Therefore, in the embodiment, it is assumed that the top point is set to (Su, Yu') in the diagram so as not to cause the decrease in saturation. In this manner, the color-space-boundary-position updating process is executed. A straight line Lz connecting the above points (Su, Yu') and (Sl', Yl') is assumed to be the equal-saturation line after the luminance correction (after the colorspace-boundary position was updated) and the saturation after the gradation correction of the target lattice point is controlled so as to be located on such a straight line. In other words, although the equal-saturation line of the target pixel before the correction is the straight line connecting the above points (Su, Yu) and (Sl, Yl), it can be considered that it changes to the straight line Lz by the gradation correction.

Subsequently, in S106, a saturation-emphasis amount (saturation-correction amount) after the luminance correction of the target lattice point is calculated. The calculating process will be also described with reference to FIG. 12. In the embodiment, the saturation of the target lattice point is controlled so as to be located on the straight line Lz as mentioned above. That is, the target lattice point (S, Y) before the luminance correction is set to (S', Y') on the straight line Lz after the luminance correction. Specifically, the gradation correction (luminance correction) is applied to the target lattice point (S, Y) before the luminance correction shown in FIG. 12 so as to convert the target lattice point (S, Y) to (S, Y'). Then, the lattice point (S', Y') is set which has the same luminance as the lattice point (S, Y') and has a saturation on the equal-saturation line (saturation correction line). Since a saturation emphasis coefficient $e=S'/S$ is obtained by S and S', values (Y', Cb', Cr') after the gradation correction of a target lattice point (Y, Cb, Cr) are obtained by the following equations as follows.

$$Y'=Tc[Y]$$

$$Cb'=Cb \times e$$

$$Cr'=Cr \times e$$

The lattice point pixel values (Y', Cb', Cr') after the correction thus obtained are converted into (R', G', B') by the well-known converting equations in S107 and stored into the 3DLUT.

By executing the above processes at all lattice points (S110), the 3DLUT after the correction can be formed.

After the 3DLUT is formed, in the image correcting unit 304, the 3DLUT is applied to each pixel value of the input image data by the well-known interpolating method (for example, tetrahedron interpolation, triangular prism interpolation, cube interpolation), thereby forming the image data after the correction. In the color converting unit 305, the image data after the correction is converted into ink color components (for example, CMYK), subjected to the pseudo gradation process 306 (for example, error diffusion, dither), and formed as an image onto a print medium by the print engine unit 307.

Figure 12:
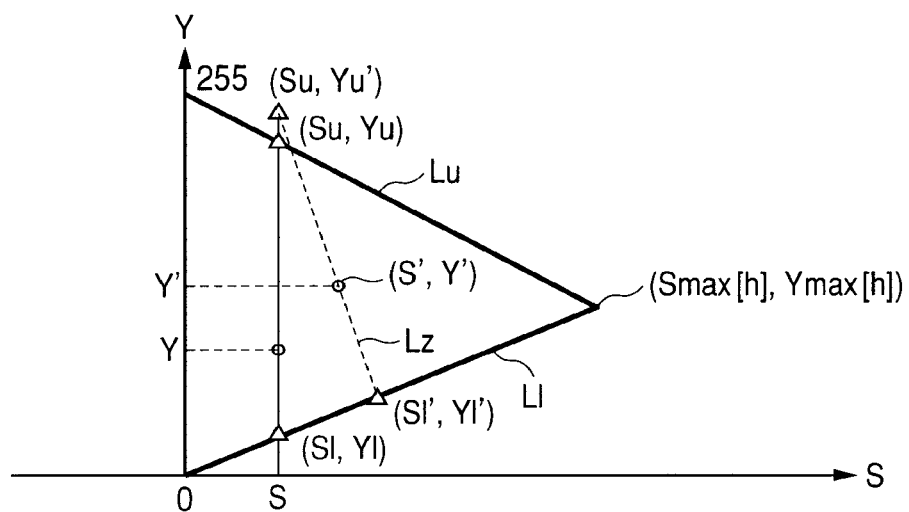
FIG. 12 is explanatory diagram of an equal-saturation-line setting method after the luminance correction.

As described above, according to the image processes described in the embodiment, by controlling the saturation after the luminance correction like a straight line Lz in FIG. 12, the saturation can be emphasized over the whole area of an intermediate length. Therefore, a feeling by the viewer that the saturation has decreased is prevented and a good-looking image corresponding to the corrected image data can be formed.

It is an essence of the embodiment to reset the equal-saturation line after the luminance correction. The equal-saturation line is such a line that even if the luminances differ, it can be considered that the saturations are equal. The equal-saturation line of the target lattice point before the luminance correction (before the color-space-boundary position is updated) is a line that connects the points (Su, Yu) and (Sl, Yl) in FIG. 12 and that is parallel with the Y axis. The saturations of all points existing like a straight line are equal. On the other hand, the equal-saturation line after the gradation correction in the embodiment is reset as a straight line connecting the bottom point (Sl', Yl') and the top point (Su, Yu') after the gradation correction. The saturation after the correction of the target lattice point is controlled so as to be located on the new equal-saturation line. Further, the new equal-saturation line is set so that it is not parallel with the Y axis and the larger the luminance, the more the line approaches the Y axis. Consequently, there exists such a special effect that for a lattice point of a small luminance, the saturation can be sufficiently emphasized and, for a lattice point of a large luminance, such saturation control can be performed that the saturation does not decrease and, it is difficult for overcorrection to occur.

Figure 13:
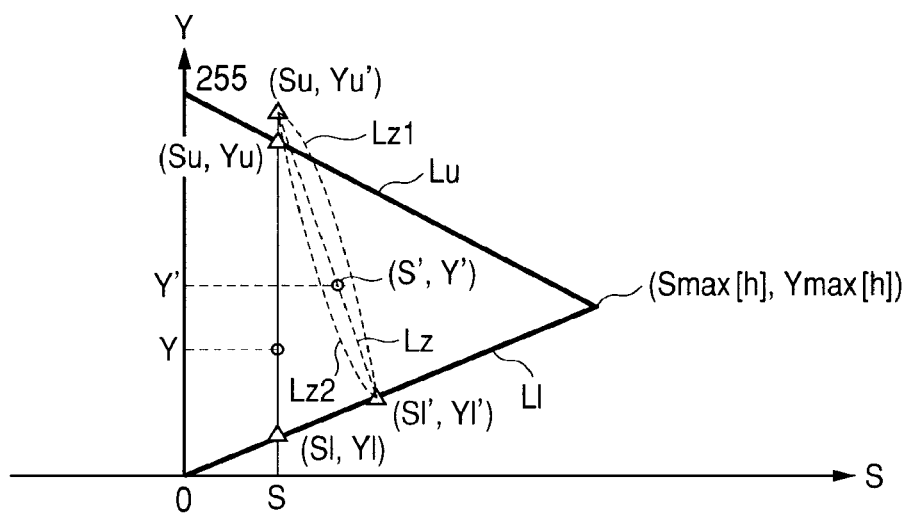
FIG. 13 is diagram for describing a variation in equal-saturation line.

Therefore, if the new equal-saturation line as mentioned above is such a line that the larger the luminance, the more the line approaches the Y axis and the smaller the luminance, the line is away from the Y axis, and the object of the embodiment can be accomplished. For example, as illustrated in FIG. 13, the equal-saturation line of the embodiment is not limited to the straight line as shown by Lz but a curve such as Lz1 or Lz2 is also incorporated in the purview of the embodiment.

The resetting of the equal-saturation line in the embodiment is determined by the inclinations of the color-space-boundary straight lines Ll and Lu. Such inclinations change variably according to the hue of the target lattice point. In other words, such a merit that the optimum equal-saturation line can be set for every hue according to the color-space boundary is also incorporated in the embodiment.

Although the correcting method using the 3DLUT in order to realize high-speed processing has been described in the embodiment, the embodiment is not limited to it. Although the whole processing amount increases, the 3DLUT is not formed, but the saturation-correction process as described in the embodiment may be executed to all of the pixel values in the input image.

The first embodiment has been described above.

Second Embodiment

In the embodiment, a method whereby the equal-saturation line mentioned in the first embodiment is changed according to a photographed scene of the input image will be described.

Figure 14:
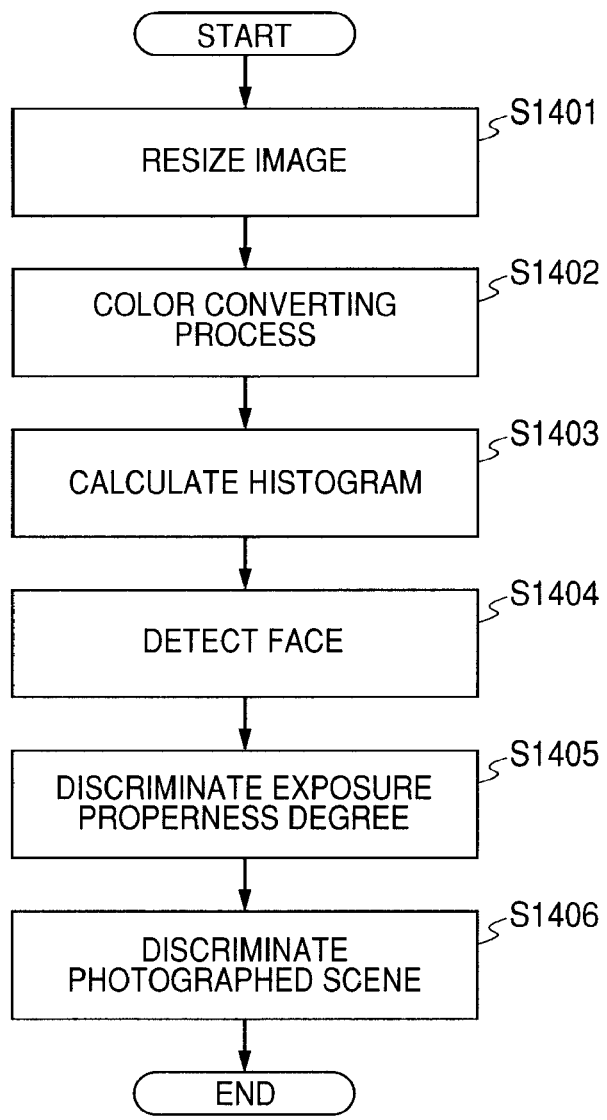
FIG. 14 is flowchart for an image analyzing unit in the second embodiment.

FIG. 14 is a flowchart whose steps are executed by the image analyzing unit 302 in the embodiment. It differs from the first embodiment with respect to a point that the photographed scene is discriminated in S1406. S1401 to S1405 in FIG. 14 are similar to S401 to S405 in FIG. 4, respectively, in the first embodiment.

In the embodiment, the discrimination about the photographed scene may be made by using any algorithm. For example, it may be discriminated from addition information added to the input image or a histogram of the image is analyzed and the photographed scene may be presumed from an analysis result. In the embodiment, for simplicity of description, it is assumed that any one of the scenes (landscape scene, person scene, night view scene, standard scene) is discriminated. Discriminated scene-type information is input to the correction-parameter calculating unit 303 and a 3DLUT in which the proper saturation control has been made for every photographed scene is formed in this unit.

Figure 15:
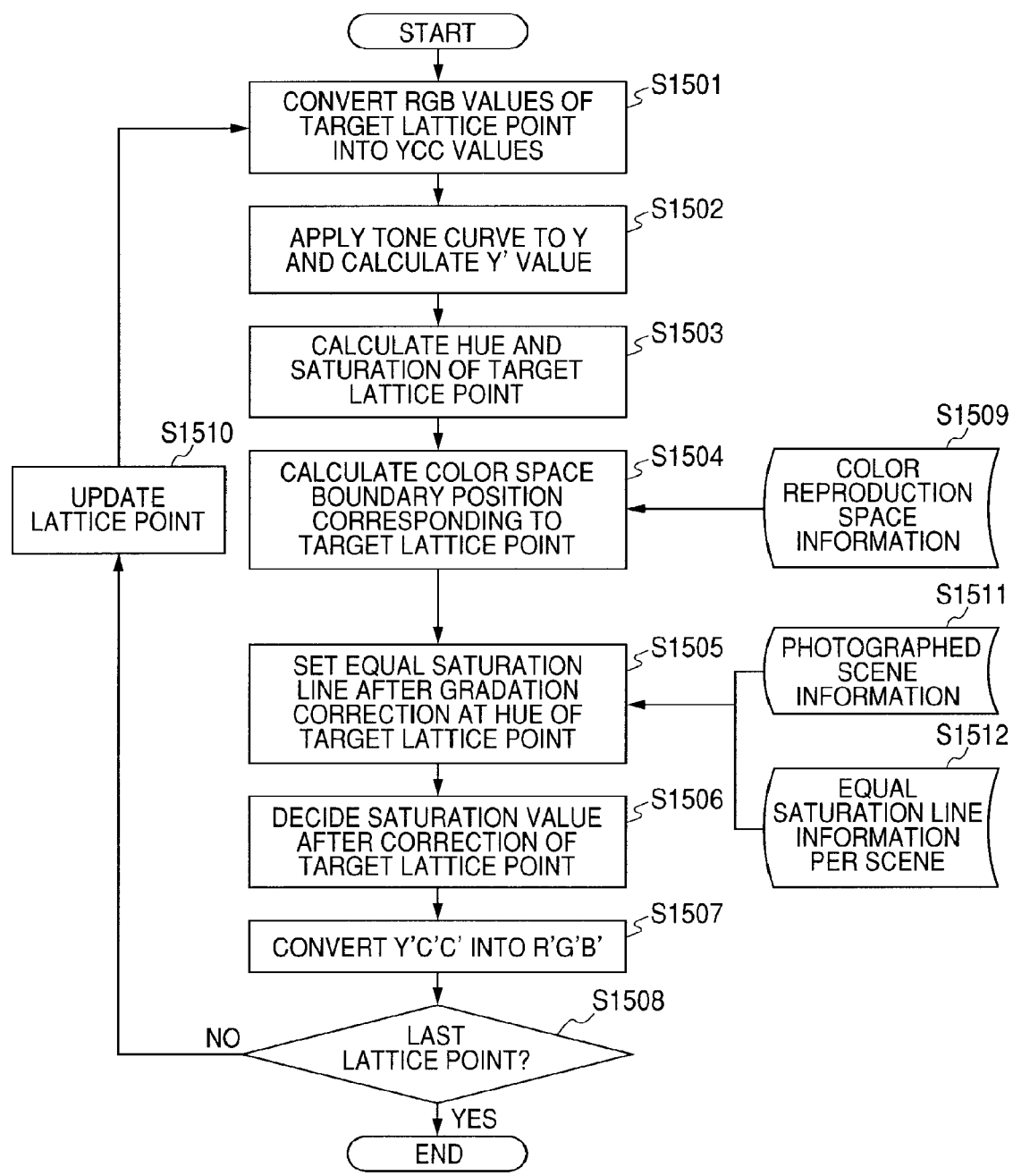
FIG. 15 is flowchart for a correction-parameter calculating unit in the second embodiment.

FIG. 15 illustrates a flowchart for the process of the correction-parameter calculating unit 303 in the embodiment. It differs from the first embodiment with respect to a point that photographed-scene information 1511 and equal-saturation-line information per scene 1512 are input to S1505. S1501 to S1510 in FIG. 15 are similar to S101 to S110 in FIG. 1, respectively, in the first embodiment.

Figure 16:
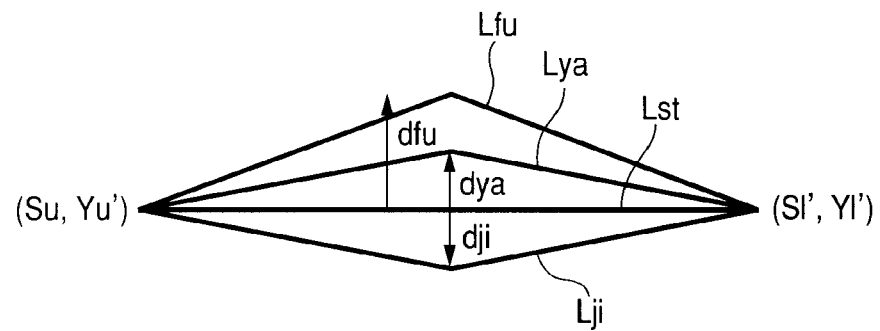
FIG. 16 is explanatory diagram of a setting method of an equal-saturation line depending on a photographed scene.

The equal-saturation-line information per scene will be described by using FIG. 16. FIG. 16 is a diagram in which the equal-saturation line Lz after the gradation correction in FIG. 12 has been rotated in the lateral direction for simplicity of description. In the embodiment, for simplicity of description, as illustrated in FIG. 16, in the case where the photographed scene is standard, a straight line Lst is set as an equal-saturation line. If the photographed scene is a night view, a straight line Lya in which the saturation-emphasis amount is slightly large is set. If the photographed scene is a landscape, a straight line Lfu in which the saturation-emphasis amount is further large is set. Further, if the photographed scene is a person, it is considered that in order to suppress the saturation emphasis as much as possible, a straight line Lji is set.

When considering such an embodiment, as for the equal-saturation-line information of S1505, for example, a deviation amount of a center portion in FIG. 16 may be held for every scene (equal-saturation-line-information holding means per scene). In the diagram, a deviation for a landscape is equal to dfu, a deviation for a night view is equal to dya, a deviation for a person is equal to dji, a deviation for a standard is equal to dst, but is assumed to be 0 in this case. As for the equal-saturation line, the line having a straight line shape itself of each of them may be held as a table.

In any of the above cases, it is a feature of the embodiment that the shape of the equal-saturation line is changed for every scene, and the equal-saturation-line information per scene holds enough information that can form the line.

Since other processes are similar to those described in the first embodiment, their description is omitted here.

As described above, in the embodiment, by changing the equal-saturation-line shape according to the photographed scene of the input image, further proper saturation control can be made every scene.

The second embodiment has been described above.

Third Embodiment

In the embodiment, a control method of preventing overcorrection for every hue of the target lattice point in the foregoing embodiment will be described.

In the first embodiment, the case where in the YCbCr space, Smax[h] and Ymax[h] as illustrated in FIG. 10 are previously held for every hue as color-reproduction-space information and the color-space boundary is formed by the straight line has been described. At this time, as illustrated on the right side of the Y axis in FIG. 17, for example, in the hue of the blue system, since the saturation Smax[h] is large and the luminance Ymax[h] is small, the inclination of a lower edge straight line Ll at the color-space boundary is very small. If such a first embodiment is applied as it is, the following problem occurs.

Figure 17:
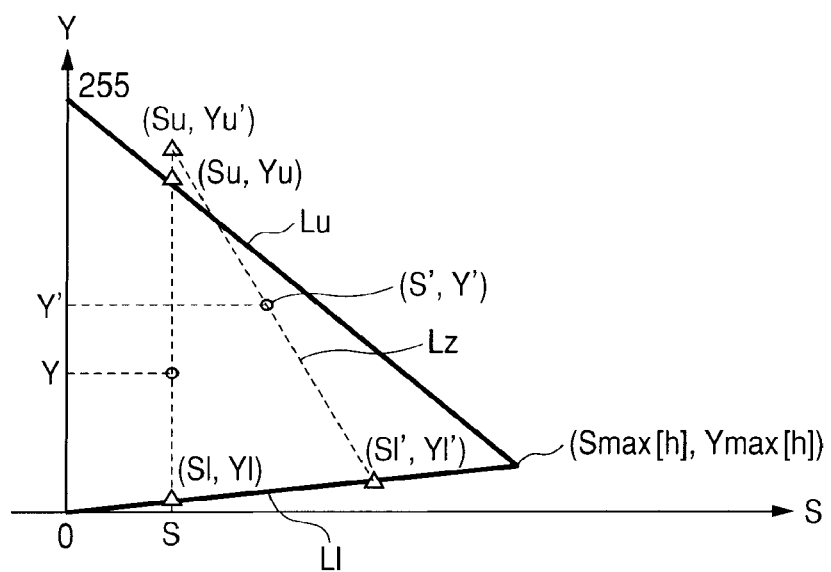
FIG. 17 is diagram for describing overcorrection of a saturation.

That is, for example, as illustrated in FIG. 17, for the bottom point (Sl, Yl) before the correction, the saturation of the bottom point (Sl', Yl') after the correction is excessively emphasized, so that if the saturation of the target lattice point is controlled so as to be located on the straight line Lz, there is a case where overcorrection occurs.

In consideration of the above problem, a method whereby when second color-reproduction-space information is set, by providing an upper limit for the saturation-emphasis amount for every hue, overcorrection is prevented, as will be described in the embodiment.

Figure 18:
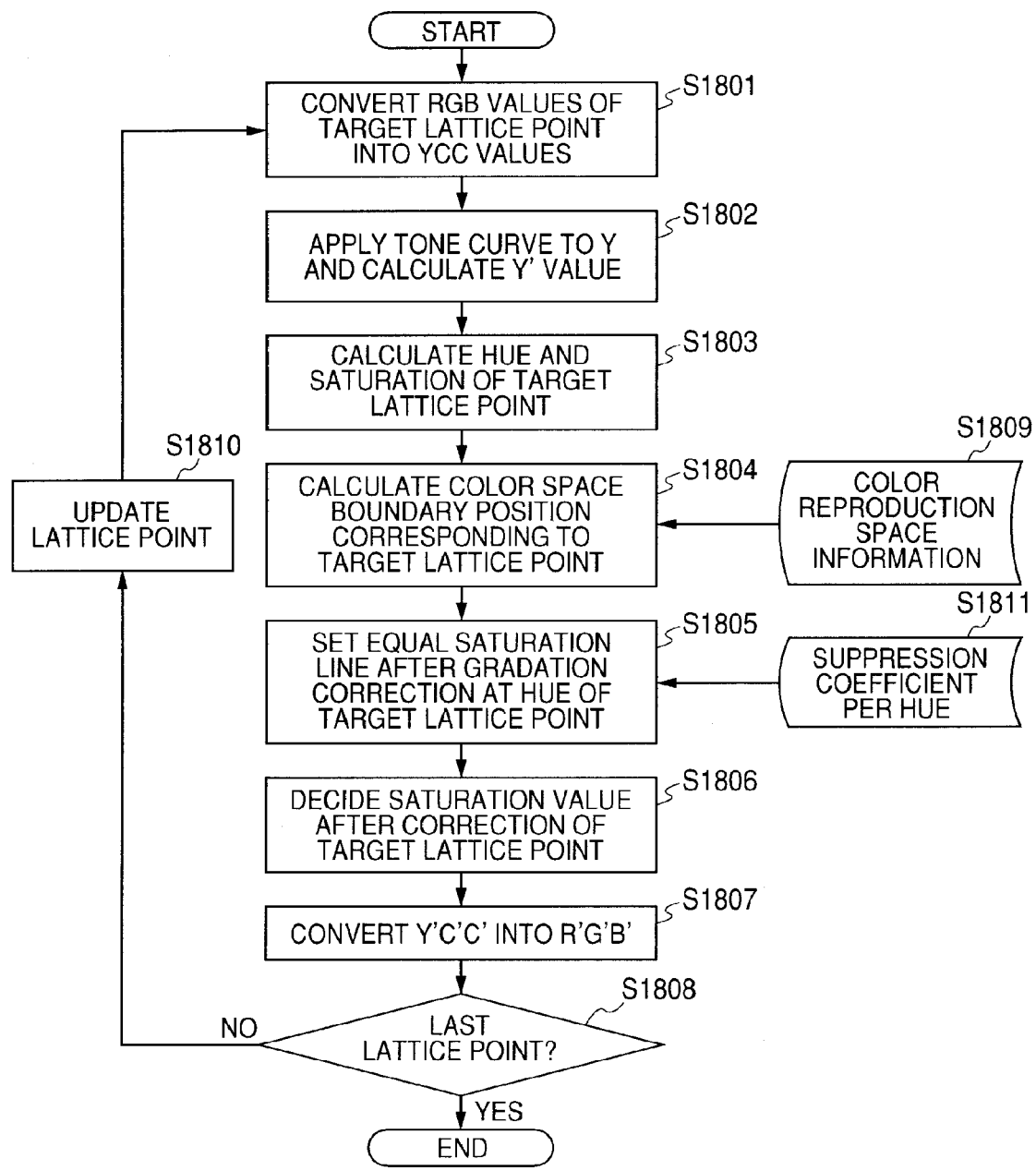
FIG. 18 is flowchart for a correction-parameter calculating unit in the third embodiment.

A flowchart for the parameter calculating unit 303 in the embodiment is illustrated in FIG. 18. The embodiment differs from the first embodiment with respect to a point that a suppression coefficient per hue 1811 is input to S1805. S1801 to S1810 in FIG. 18 are similar to S101 to S110 in FIG. 1, respectively, in the first embodiment.

The suppression coefficient per hue in the embodiment is used to suppress a fluctuation amount of the bottom point after the luminance correction. In the embodiment, the suppression coefficient for the bottom point is assumed to be Rl[360] and a range of available values is set, for example, as follows.

$$Rl[360]=1.0\sim2.5$$

In Rl[h], a value within a range of 1.0 to 2.5 has been set according to the hue. Particularly, at a hue near the hue of the blue system in which the inclination of the straight line L1 is small, a value near 2.5 has been set as a table and, at a hue near the hue of yellow in which the inclination is steep, a value near 1.0 has been set as a table (saturation suppression coefficient holding means).

When the hue of the target lattice point is set to h, a saturation-emphasis amount Pl of the bottom point before and after the gradation correction can be calculated as follows.

$$Pl=Sl'/Sl$$

When Pl is larger than Rl[h], Sl' is suppressed as follows.

$$Sl'=Sl\times Rl[h]$$

By using the value of the bottom point (Sl', Yl') suppressed as mentioned above, the equal-saturation line is set and the saturation value of the target lattice point is decided.

Since other processes are similar to those in the first embodiment, their description is omitted here.

As described above, according to the embodiment, by holding the saturation-suppression coefficient of the bottom point for every hue, particularly, in a hue area where the overcorrection is liable to occur, the overcorrection can be prevented.

All of the specific numerical values disclosed in the foregoing embodiments are an example for description. So long as the object of the embodiment can be accomplished, even if any numerical values are used, naturally, they are incorporated in the purview of the embodiment.

The third embodiment has been described above.

Fourth Embodiment

The embodiments so far have been described by limiting the color space to sRGB for simplicity of description. However, for example, in the case where the present system is built in the print system of the printer and executed, since the color space of the input image and the output color space are not always limited only to sRGB, it is necessary to consider a form which can be also applied to other color spaces. In the embodiment, a method whereby a plurality of input color spaces are presumed, the color-reproduction-space information is held for every color space, and they are switched and used as necessary, thereby coping with the foregoing problem, as will now be described.

Figure 19:
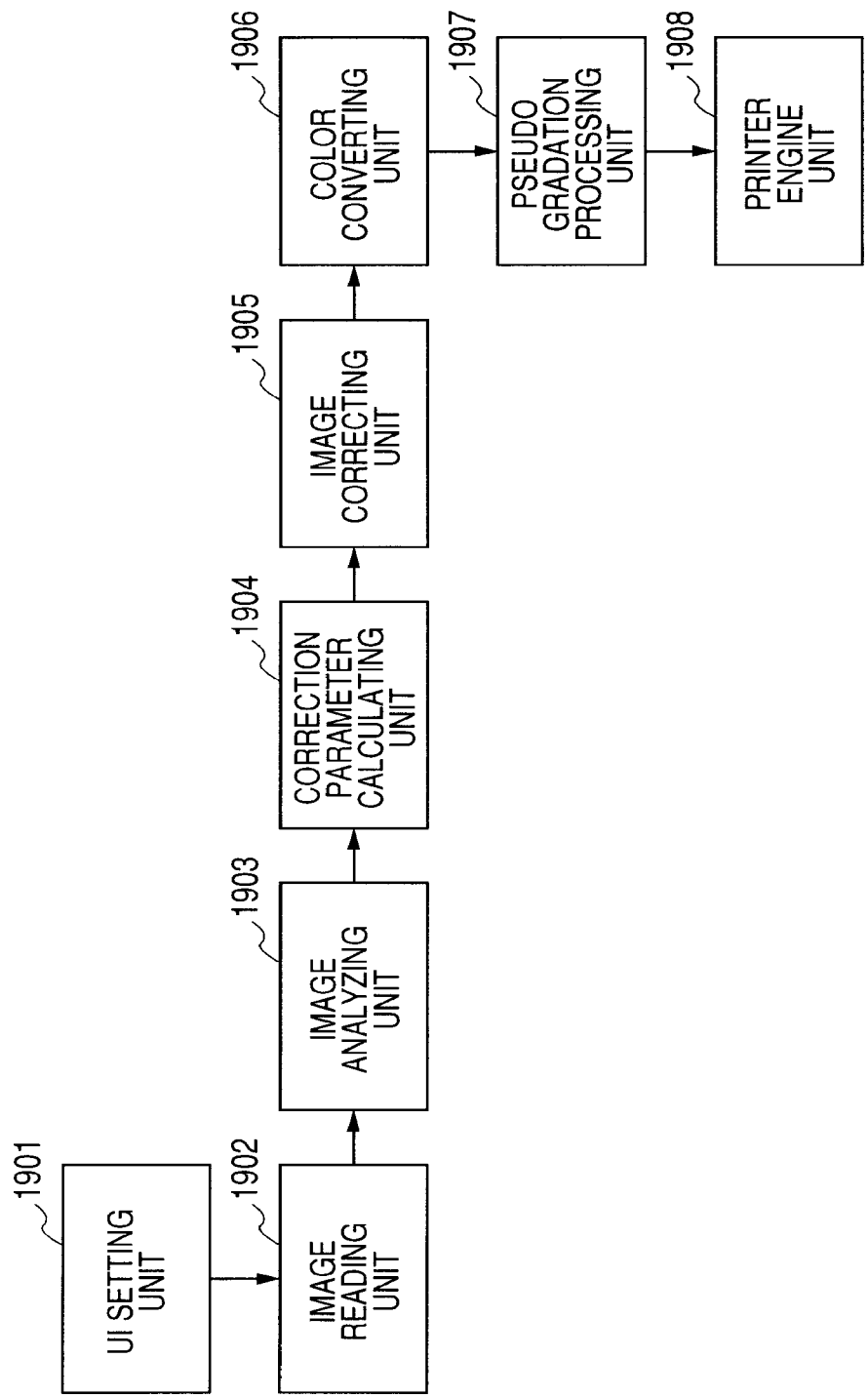
FIG. 19 is block diagram of processes in the fourth embodiment.

A block diagram of processes in the embodiment is illustrated in FIG. 19. The embodiment differs from the first embodiment with respect to a point that an UI setting unit 1901 is added. The UI setting unit 1901 performs steps for allowing the user to instruct setting and execution of a desired printing process through the UI 205 of the printer. Subsequent processes are executed according to the contents of an instruction from the user.

For example, when the user instructs an execution of a photograph-printing process from the memory card, an image reading unit 1902 reads out desired image data from the memory card 209 connected through the IF 206. The read image data is input to an image analyzing unit of the next stage together with attribute information adapted to specify the color space of the input image.

When the user instructs an execution of a copy process, the image reading unit 1902 drives the scanner provided for the printer and reads the original. At this time, since general printed matter (for example, magazine, catalogue) has such a wide color area as to exceed the sRGB color space in many cases, the image is read as adobe RGB data. The image data thus obtained is input to the image analyzing unit of the next stage together with the addition information which can identify that the data is the adobe RGB data.

Since the processes of the image analyzing unit are similar to those in the embodiments so far, their detailed description is omitted here.

Figure 20:
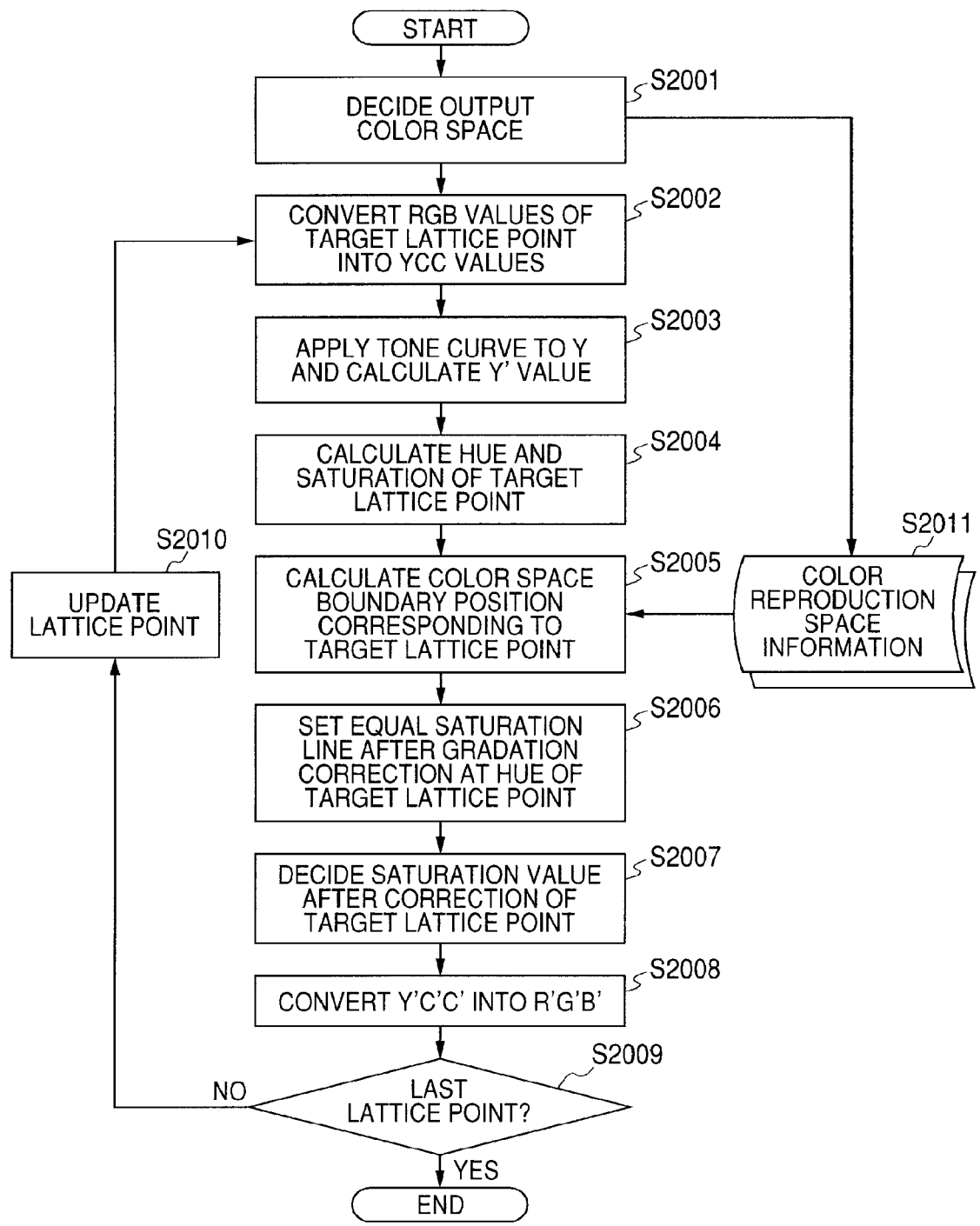
FIG. 20 is flowchart for a correction-parameter calculating unit in the fourth embodiment.

FIG. 20 illustrates a flowchart for processes of a correction-parameter calculating unit 1904 in the embodiment. The embodiment differs from the embodiments so far with respect to a point that the step S2001 of deciding the output color space is inserted and that a plurality of color-reproduction-space information 2011 has been held.

Figure 21:
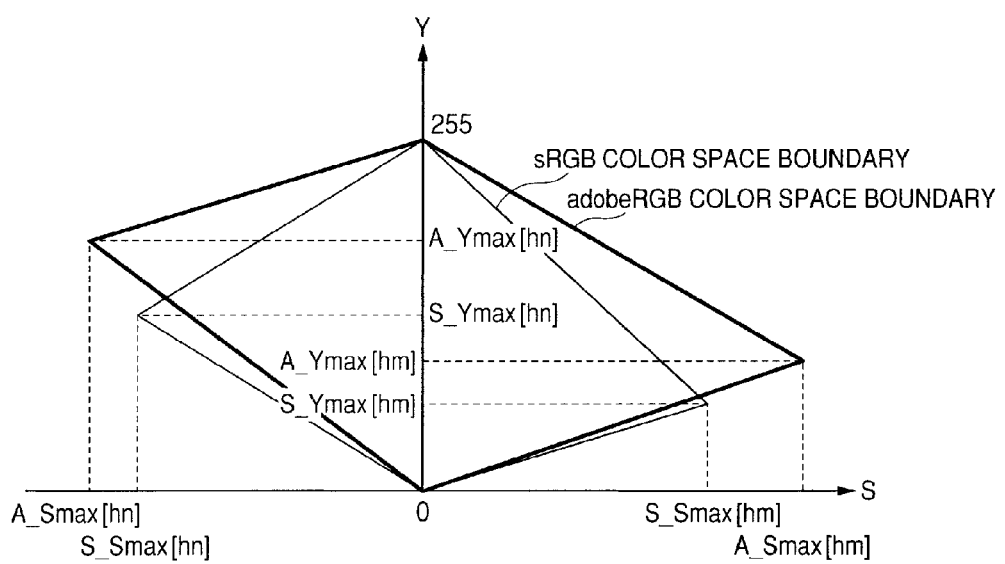
FIG. 21 is diagram for describing a difference of color-space boundaries due to a difference of color spaces.
Figure 22:
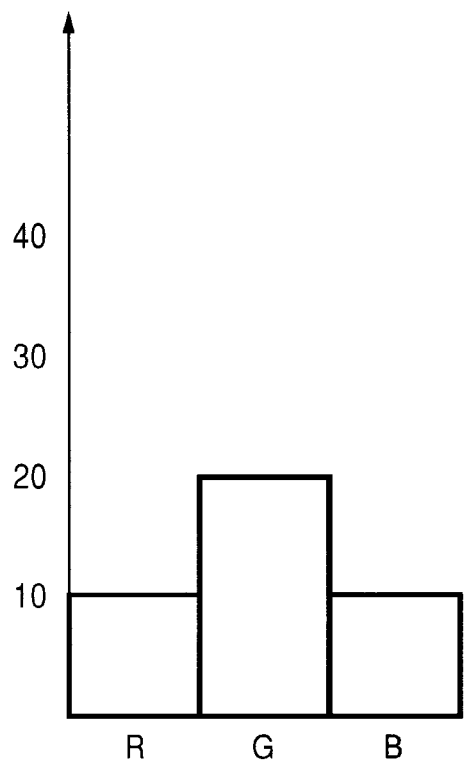
FIG. 22 is diagram for describing saturation correction in the related art.
Figure 23:
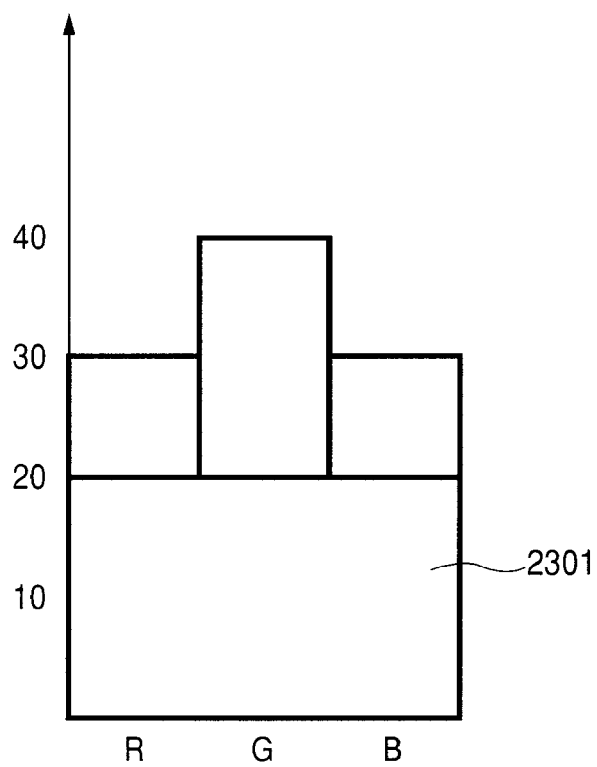
FIG. 23 is diagram for describing saturation correction in the related art.
Figure 24:
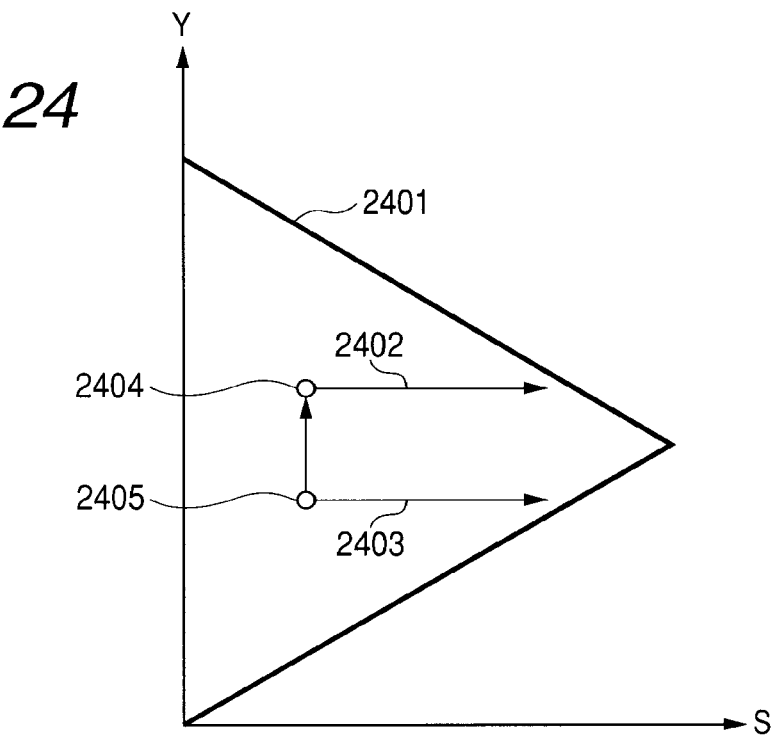
FIG. 24 is diagram for describing saturation correction in the related art.
Figure 25:
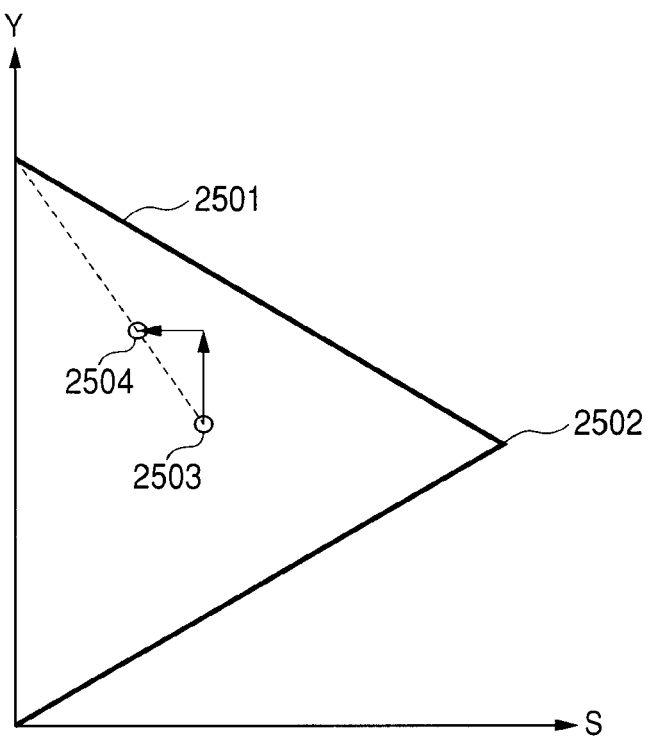
FIG. 25 is diagram for describing saturation correction in the related art.

In the embodiment, the output color space, that is, the color space of a 3DLUT, which is calculated by the correction-parameter calculating unit, is assumed to be two kinds of color spaces comprising sRGB and adobe RGB for simplicity of description. FIG. 21 is a schematic diagram illustrating color-space boundaries of the sRGB and adobe RGB spaces on a plane in which the ordinate axis indicates the luminance and the abscissa axis indicates the saturation with respect to a certain hue. Ordinarily, in the case of adobe RGB shown by a bold line, a wider color space can be covered as compared with that by sRGB. In the embodiment, in order to cope with the two color spaces, S_Smax[h] and S_Ymax[h] are previously calculated and held as color space information of sRGB, and A_Smax[h] and A_Ymax[h] are previously calculated and held as color-space information of adobe RGB. Since the meaning of the above array is similar to that described in the first embodiment, its detailed description is omitted here.

In an output color-space determining process of S2001, with reference to the addition information showing the color space added to the input image, if the input image is sRGB, color-reproduction-space information 2011 for sRGB is selected and a 3DLUT of sRGB is formed. On the other hand, if the input image is adobe RGB, color-reproduction-space information 2011 for adobe RGB is selected and a 3DLUT of adobe RGB is formed.

Since other processes are similar to those in the embodiments so far, its detailed description is omitted here.

As described above, in the embodiments, for the various kinds of color spaces in which the input is presumed, color-reproduction-space information in the luminance-color-difference space is previously held. Further, by selecting and using desired color-reproduction-space information according to the color space of the image data read by the reading apparatus, adaptive processes can be performed to the color space.

Although the method of switching the plurality of held color-space-boundary tables according to the color space of the input image has been mentioned in the embodiments, the embodiment is not limited to it. Naturally, for example, a construction in which they are switched by selecting sheet types, print quality, and profiles that have been set by the UI setting unit are also incorporated in the purview of the embodiment.

The color space is not limited to sRGB and adobe RGB but, naturally, the embodiment can be also applied to other color spaces.

Further, although the output-color-space deciding method in S2001 has been described with respect to the method of deciding according to the color space of the input image for simplicity of description, the embodiment is not limited to it. For example, the output color space may have been predetermined according to the operating mode of the printer, sheet, and print quality that have been preset.

The fourth embodiment has been described above.

Other Embodiments

Although the luminance-color-difference space has been limited to YCbCr and described in the foregoing embodiments for simplicity of description, the embodiment is not limited to it. For example, naturally, the case where it is applied to the well-known luminance-color-difference space (for example, Lab) is also incorporated in the purview of the embodiment.

As for the method of holding the color-reproduction-space information, although the method has been described in the embodiment whereby the maximum saturation value and the luminance values in the maximum saturation value are held for every hue of the color space and the color-space-boundary position in an arbitrary saturation value is calculated, the embodiment is not limited to it.

The color-space-boundary shape itself may be held for every hue or the color-space-boundary shapes are not held at all hue angles but, for example, the boundary information is held at an interval of 5° and the boundary information can be also obtained by interpolation for such an interval. Naturally, other similar holding means of the color-reproduction-space information are incorporated in the purview of the embodiment.

Although the construction in which the top point after the gradation correction is certainly set so as not to cause the saturation decrease has been disclosed in the first embodiment, the embodiment is not limited to it. For example, even if the top point (Su, Yu') is set to the luminance-axis side within a range where the appearance of the image after the correcting process does not deteriorate, so long as such a construction lies within the scope that can realize the object of the embodiment, it is incorporated in the purview of the embodiment.

Aspects of the present embodiment can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present embodiment has been described with reference to exemplary embodiments, it is to be understood that the embodiment is not limited to the disclosed exemplary embodiments. The scope of the following claims is to be accorded the broadcast interpretation so as to encompass all such modifications and equivalent structures and functions.

This application claims the benefit of Japanese Patent Application No. 2009-122804, filed May 21, 2009, which is hereby incorporated by reference herein in its entirety.

The invention claimed is:

1. An image processing apparatus comprising:
a luminance correction unit configured to correct a luminance of a target lattice point in a lookup table and a luminance of a color space boundary in a hue of the target lattice point;
a determination unit configured to determine the amount of a saturation emphasis such that the amount of the saturation emphasis becomes smaller as the luminance corrected by the luminance correction unit becomes larger, based on the luminance of the target lattice point corrected by the luminance correction unit and the luminance of the color space boundary corrected by the luminance correction unit;
a saturation correction unit configured to correct a saturation of the target lattice point corrected by the luminance correction unit using the amount of the saturation emphasis determined by the determination unit; and
a generating unit configured to generate a correction characteristic for correcting a luminance and a saturation using the luminance and the saturation of the target lattice point corrected by the saturation correction unit.

2. The image processing apparatus according to claim 1, further comprising a correction unit configured to correct a luminance and a saturation in an image using the correction characteristic generated by the generating unit.

3. The image processing apparatus according to claim 2, wherein the luminance correction unit determines the amount of the luminance correction based on the luminance of a face included in the image.

4. The image processing apparatus according to claim 1, wherein the amount of the saturation emphasis varies according to the hue of the target lattice point.

5. The image processing apparatus according to claim 4, wherein the amount of the saturation emphasis becomes larger when a hue of the target lattice point is blue than when a hue of the target lattice point is yellow.

6. The image processing apparatus according to claim 1, wherein the color space comprises sRGB space or adobe RGB space.

7. The image processing apparatus according to claim 1, further comprising a unit configured to retain the saturation and luminance of a maximum saturation point in the color space for individual hues.

8. An image processing method carried out in an image processing apparatus comprising:
correcting a luminance of a target lattice point in a lookup table and a luminance of a color space boundary in a hue of the target lattice point in a first correcting step;
determining the amount of a saturation emphasis such that the amount of the saturation emphasis becomes smaller as the luminance corrected by the luminance correction step becomes larger, based on the luminance of the target lattice point corrected by the luminance correction step and the luminance of the color space boundary;
correcting a saturation of the target lattice point corrected by the luminance correcting step using the determined amount of the saturation emphasis determined by the determining step in a second correcting step; and
generating a correction characteristic for correcting a luminance and a saturation using the luminance and the saturation of the target lattice point corrected by the second correcting step.

9. The image processing method according to claim 8, further comprising a step of correcting a luminance and a saturation in an image using the correction characteristic generated by the generating step.

10. The image processing method according to claim 9, wherein the luminance correction step determines the amount of the luminance correction based on the luminance of a face included in the image.

11. The image processing method according to claim 8, wherein the amount of the saturation emphasis varies according to the hue of the target lattice point.

12. The image processing apparatus according to claim 11, wherein the amount of the saturation emphasis becomes larger when a hue of the target lattice point is blue than when a hue of the target lattice point is yellow.

13. The image processing method according to claim 8, wherein the color space comprises sRGB space or adobe RGB space.

14. The image processing method according to claim 8, further comprising a step of retaining the saturation and luminance of a maximum saturation point in the color space for individual hues.

* * * * *